(No Model.)
M. FLAMMANG.
GROUND GLASS FRAME FOR CAMERAS.
No. 245,808. Patented Aug. 16, 1881.
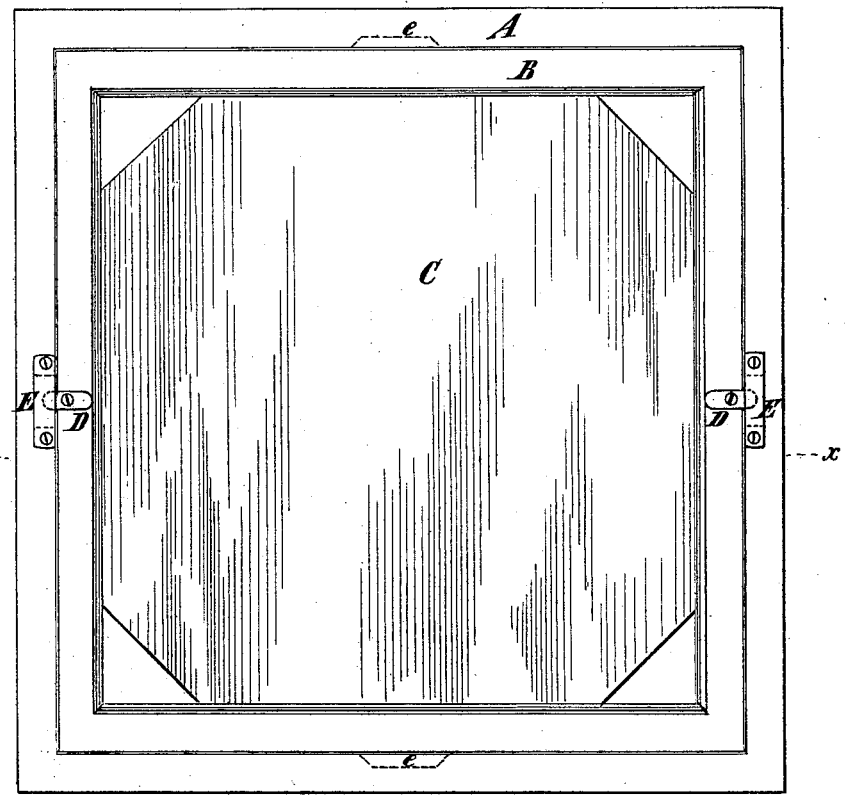
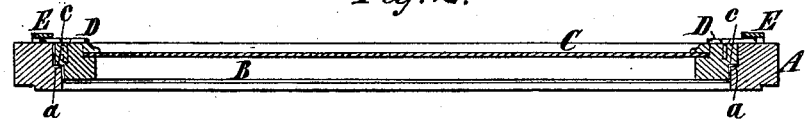
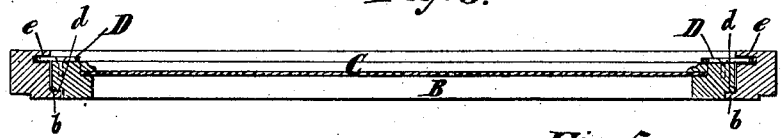
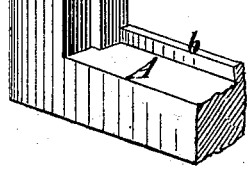
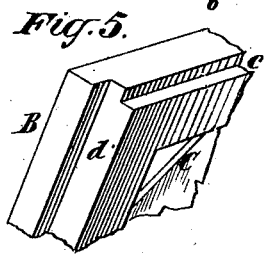
Witnesses
Inventor
Mathias Flammang
By his Atty.
Edwin H. Brown.

United States Patent Office.

MATHIAS FLAMMANG, OF NEWARK, NEW JERSEY, ASSIGNOR TO THE SCOVILL MANUFACTURING COMPANY, OF WATERBURY, CONNECTICUT.

GROUND-GLASS FRAME FOR CAMERAS.

SPECIFICATION forming part of Letters Patent No. 245,808, dated August 16, 1881.

Application filed May 25, 1881. (No model.)

*To all whom it may concern:*

Be it known that I, MATHIAS FLAMMANG, of Newark, in the county of Essex and State of New Jersey, have invented certain new and useful Improvements in Means for Adjusting and Securing Ground-Glass Plates and Frames in the Back Frames of Photographic Cameras, of which the following is a specification.

The object of my improvements is to provide for placing the ground glass and ground-glass frame employed in a photographic camera in either of two positions in the back frame, so as to adapt the camera for use with the process of photography known as the "wet-plate" process or the process known as the "dry-plate" process.

The improvements consist in the combination, with a back frame having in opposite edges rabbets or their equivalents of corresponding depth, of a ground-glass frame having rabbets of corresponding depth in parallel edges and rabbets of a different depth in its intermediate edges, and adapted to be supported in either of two positions in the rabbets in the back frame, and means for retaining said ground-glass frame in such positions.

In the accompanying drawings, Figure 1 is a view of the rear side of the back frame, ground-glass frame, and ground glass embodying my improvements. Fig. 2 is a transverse section of the same on the line x x, Fig. 1. Fig. 3 is a transverse section at right angles to Fig. 2 and with the ground-glass frame reversed in position. Fig. 4 is a perspective view of a corner of the back frame, and Fig. 5 is a perspective view of a corresponding corner of the ground-glass frame.

Similar letters of reference designate corresponding parts in all the figures.

The camera embodying my improvements may be of any approved style; hence I have not deemed it necessary to represent it.

A designates a back frame for a camera. It may be adapted to have any of the usual adjustments.

B designates a ground-glass frame, which is removably attached to the back frame A; and C designates the ground glass. In the rear face of its side edges the back frame has rabbets $a$ of corresponding depth, and in its upper and lower edges it has rabbets $b$ of a different depth. The ground-glass frame has in the front face of two parallel edges rabbets $c$ of the same depth, and in its two intermediate edges rabbets $b$ of a different depth.

When the ground-glass frame is inserted in the back frame in such position that its rabbets $c$ fit against the rabbets $a$ the ground-glass frame will be supported in its rearmost position. It may then be secured in that position by manipulating buttons D, so that they will slip under and thus engage with straps E on the rear face of the back frame. When the ground-glass frame is reversed and inserted in the back frame so that its rabbets $d$ fit against the rabbets $b$ it occupies a position considerably farther forward of its former position. It may then be secured in place by manipulating the buttons D to cause them to engage with recesses $e$ in the top and bottom of the back frame. By thus providing for securing the ground-glass frame in either of two positions in the back frame I provide for using it for focusing for taking photographs by either the dry-plate process or the wet-plate process, thus greatly enhancing the value of the camera comprising it.

It is obvious that these improvements may be applied to existing cameras at a trifling expense.

In lieu of the rabbets, shoulders, ledges, or supports formed in other ways may be used.

What I claim as my invention, and desire to secure by Letters Patent, is—

1. The combination, with a back frame having in opposite edges rabbets or their equivalents of corresponding depth, a ground-glass frame having in two parallel edges rabbets or their equivalents of the same depth, and in its two intervening edges rabbets of a different depth, whereby it is adapted to be secured in the back frame in either of two positions, and means for securing said ground-glass frame in position, substantially as specified.

2. The combination of the back frame, A, with its rabbets $a$, straps E, and recesses $e$, the ground-glass frame with its rabbets $c$ and $d$, and the buttons D, substantially as specified.

MATHIAS FLAMMANG.

Witnesses:
 EDWIN H. BROWN,
 A. C. WEBB.